(12) United States Patent
Vajo et al.

(10) Patent No.: US 11,584,859 B2
(45) Date of Patent: Feb. 21, 2023

(54) TITANIUM AND MAGNESIUM COMPOUND FOR CORROSION-RESISTANT COATINGS

(71) Applicant: The Boeing Company, Chicago, IL (US)

(72) Inventors: John J. Vajo, West Hills, CA (US); Jason Graetz, Calabasas, CA (US); Alain A. Adjorlolo, Seattle, WA (US)

(73) Assignee: The Boeing Company, Chicago, IL (US)

( * ) Notice: Subject to any disclaimer, the term of this patent is extended or adjusted under 35 U.S.C. 154(b) by 694 days.

(21) Appl. No.: 16/541,754

(22) Filed: Aug. 15, 2019

(65) Prior Publication Data

US 2021/0047522 A1    Feb. 18, 2021

(51) Int. Cl.
| | |
|---|---|
| *C23C 22/34* | (2006.01) |
| *C09D 5/10* | (2006.01) |
| *C09D 7/61* | (2018.01) |
| *C01G 23/00* | (2006.01) |
| *C23C 22/54* | (2006.01) |
| *C23C 22/48* | (2006.01) |

(52) U.S. Cl.
CPC .......... *C09D 5/10* (2013.01); *C01G 23/002* (2013.01); *C09D 7/61* (2018.01); *C23C 22/54* (2013.01); *C01P 2002/72* (2013.01); *C01P 2002/74* (2013.01); *C01P 2002/76* (2013.01); *C01P 2002/77* (2013.01); *C01P 2004/03* (2013.01)

(58) Field of Classification Search
CPC .................................................... C23C 22/34
USPC ......................................................... 148/247
See application file for complete search history.

(56) References Cited

U.S. PATENT DOCUMENTS 2,403,228 A * 7/1946 Mccord ............... C01G 23/006
                                                            423/598
2020/0216963 A1    7/2020 Vajo et al.

FOREIGN PATENT DOCUMENTS

| JP | 2012 005999 | 1/2012 |
| SU | 1353727 | 11/1987 |

OTHER PUBLICATIONS

International Search Report from International Patent Application PCT/US2020/045672, dated Nov. 20, 2020, 13 pages.

* cited by examiner

*Primary Examiner* — Lois L Zheng
(74) *Attorney, Agent, or Firm* — Haynes and Boone, LLP (57) ABSTRACT

A crystalline titanium and magnesium compound having an X-ray diffraction pattern having interplanar spacing (d-spacing) values at about 5.94, 3.10, 2.97, 2.10, 1.98, 1.82, and 1.74±0.1 angstroms may be used in protective coatings for metal or metal alloy substrates. The coatings exhibit excellent corrosion resistances and provide corrosion protection equal to or better than typical non-chromate coatings.

20 Claims, 5 Drawing Sheets

TITANIUM AND MAGNESIUM COMPOUND FOR CORROSION-RESISTANT COATINGS

BACKGROUND

1. Technical Field

The present disclosure relates to coating compositions and processes and, more particularly, to coating compositions including a crystalline titanium and magnesium compound and related processes.

2. Related Art

High strength alloys such as aluminum alloys are widely used in various industries such as the aerospace industry due to their high strength to weight ratio. However, these alloys are prone to corrosion due to the presence of alloying materials.

In order to protect these alloys from the environment, a chrome conversion coating may be provided on a surface of an alloy followed by application of primer and a top coat. Although organic paint systems applied on the surface provide good barrier properties against corrosion, even small defects formed in the organic paint ensure pathways for the ingress of electrolyte to the metallic surface, which initiates localized corrosion. Therefore, chromium based conversion coatings have been used in anti-corrosion pretreatments before application of organic coatings. However, hexavalent chromium compounds are not preferred.

Thus, there is a need for coating compositions and processes that are chromium-free and provide a coating that is corrosion-resistant.

SUMMARY

In accordance with examples of the present disclosure, various coatings and methods are provided for corrosion protection. Advantageously, the coatings do not include hexavalent chromium, and instead include a crystalline titanium and magnesium compound that is suitable for use on substrates such as metal or metal alloy substrates (e.g., aluminum substrates, aluminum alloy substrates (e.g., AA 2024-T3, AA 6061, or AA 7075), or other substrates).

In one aspect of the present disclosure, the crystalline titanium and magnesium compound has an X-ray diffraction (XRD) pattern having interplanar spacing (d-spacing) values at about 5.94, 3.10, 2.97, 2.10, 1.98, 1.82, and 1.74±0.1 angstroms. In some examples, the crystalline titanium and magnesium compound further has an XRD having additional interplanar spacing (d-spacing) values at about 1.62, 1.57, 1.55, 1.48, 1.44, 1.34, 1.28, 1.21, 1.18, 1.15, 1.13, 1.08, 1.03±0.1 angstroms.

In various examples, the crystalline titanium and magnesium compound further has a cubic symmetry and a lattice parameter from about 10.225 angstroms to about 10.325 angstroms.

In certain examples, the crystalline titanium and magnesium compound further has an XRD pattern, produced with an x-ray wavelength of 1.54 angstroms (Cu k alpha), having peaks at 14.89°, 28.78°, 30.09°, 43.10°, 45.85°, 50.20°, and 52.66°±0.25 2θ. In several examples, the crystalline titanium and magnesium compound further has XRD peaks, produced with an x-ray wavelength of 1.54 angstroms (Cu k alpha), at 56.63°, 58.90°, 59.65°, 62.59°, 64.75°, 70.31°, 73.71°, 79.02°, 81.63°, 84.20°, 86.23°, 91.34°, and 96.59°±0.25 2θ.

In several examples, titanium is present at about 15 at % to about 25 at % and magnesium is present at about 1 at % to about 8 at % in the crystalline titanium and magnesium compound. In certain examples, the crystalline titanium and magnesium compound also include oxygen and fluorine. In these examples, the oxygen is present at about 30 at % to about 45 at % and the fluorine is present at about 30 at % to about 40 at %. In various examples, titanium is present at about 25 at %, magnesium is present at about 5 at %, oxygen is present at about 35 at %, and fluorine is present at about 35 at %. As used herein, "at %" or atomic percent provides the percentage of one kind of atom relative to the total number of atoms in the crystalline titanium and magnesium compound. Atomic percent may be measured by any suitable method known to those of ordinary skill in the art, including, but not limited to Energy Dispersive X-Ray Spectroscopy (EDX) or X-ray Photoelectron Spectroscopy (XPS).

The crystalline titanium and magnesium compound described above may be present in a protective coating. In various examples, the protective coating is a mixture of two or more compounds and further includes titanium dioxide. In some examples, the protective coating has a thickness of about 500 nm to about 10 μm.

In a second aspect of the present disclosure, a method of preparing a crystalline titanium and magnesium compound having an X-ray diffraction (XRD) pattern having interplanar spacing (d-spacing) values at about 5.94, 3.10, 2.97, 2.10, 1.98, 1.82, and 1.74±0.1 angstroms, includes preparing a solution including a titanium compound at a concentration of about 0.1 M to about 0.4 M, boric acid at a concentration of about 0.3 M to about 1 M, sodium tetraborate at a concentration of about greater than 0 M to about 0.0065 M, and a magnesium compound at a concentration of about 0.01 M to about 0.1 M.

In various examples, the titanium compound includes ammonium hexafluorotitanate and the magnesium compound includes one or more of magnesium acetate, magnesium sulfate, magnesium chloride, or magnesium nitrate.

In some examples, preparing the solution includes dissolving the boric acid, the sodium tetraborate, and the magnesium compound in water to form a first solution, dissolving the titanium compound in water to form a second solution, and pouring the second solution into the first solution.

In a further aspect of the present disclosure, a method includes preparing a solution including a titanium compound at a concentration of about 0.1 M to about 0.4 M, boric acid at a concentration of about 0.3 M to about 1 M, sodium tetraborate at a concentration of about greater than 0 M to about 0.0065 M, and a magnesium compound at a concentration of about 0.01 M to a 0.1 M to form a titanium/magnesium solution.

In various examples, the method further includes reacting a metal surface with the titanium/magnesium solution, and drying the metal surface with the titanium/magnesium solution to form a titanium/magnesium protective coating on the metal surface. In several examples, the metal surface includes aluminum or an aluminum alloy such as 2024-T3 aluminum alloy, 6061 aluminum alloy, or 7075 aluminum alloy.

In some examples, reacting the metal surface with the titanium/magnesium solution includes immersing the metal surface in the titanium/magnesium solution. In certain examples, the metal surface is immersed in the titanium/magnesium solution at room temperature for about 0.5 to about 20 hours.

In other examples, reacting the metal surface with the titanium/magnesium solution includes spray applying the titanium/magnesium solution on the metal surface.

In certain examples, the method further includes applying a primer and/or a paint on the titanium/magnesium protective coating.

The scope of the disclosure is defined by the claims, which are incorporated into this section by reference. A better understanding of the methods and formulations for titanium/magnesium coatings of the present disclosure, as well as an appreciation of the above and additional advantages thereof, will be afforded to those of skill in the art by a consideration of the following detailed description of one or more examples thereof. In this description, reference is made to the various views of the appended sheets of drawings, which are briefly described below, and within which, like reference numerals are used to identify like ones of the elements illustrated therein.

DETAILED DESCRIPTION

Coatings for corrosion protection that do not include hexavalent chromium are provided. The coating is deposited from a precursor solution including boric acid, a titanium compound, sodium tetraborate, and a magnesium compound dissolved in water, and includes a novel crystalline titanium and magnesium compound. Elemental analysis of the deposited coating by Energy Dispersive X-ray Spectroscopy (EDX) yielded a composition of about 23 at % titanium, 4 at % magnesium, 37 at % oxygen, and 36 at % fluorine.

Advantageously, the titanium/magnesium coating exhibits corrosion resistances greater than 100 times the resistance of uncoated aluminum substrates, which is a level of corrosion resistance similar to the resistance of commercial chromate-based coatings. Accordingly, the titanium/magnesium coating provides corrosion protection equal to or better than conventional non-chromate coatings.

Figure 1:
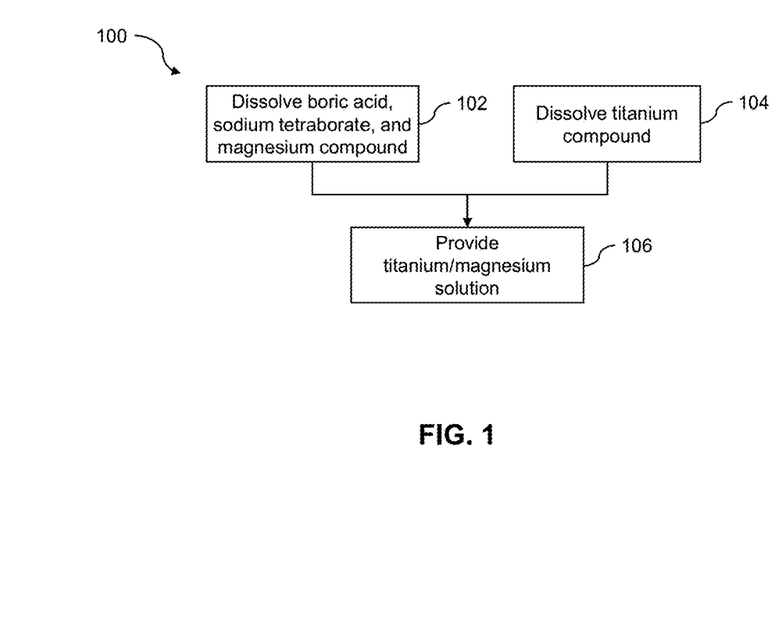
FIG. 1 illustrates an example process for preparing a titanium/magnesium solution in accordance with an example of the present disclosure.

FIG. 1 illustrates an example process 100 for preparing a titanium/magnesium solution that may be used to deposit a titanium/magnesium coating on a metal surface. The solution is prepared in two parts, and the two parts are then mixed together to form the titanium/magnesium solution.

At block 102, a composition including boric acid, sodium tetraborate, and a magnesium compound is prepared. For example, boric acid ($H_3BO_3$), sodium tetraborate decahydrate ($Na_2B_4O_7 \cdot 10H_2O$), and a magnesium salt (e.g., magnesium acetate ($Mg(CH_3COO)_2$), magnesium sulfate ($MgSO_4$), magnesium chloride ($MgCl_2$), and/or magnesium nitrate ($Mg(NO_3)_2$) are dissolved in water. In some examples, $MgCl_2$ is used (even though chloride ions are known to accelerate the corrosion of metal). The chloride ion etches the native surface oxide, which leads to the deposition of a more adherent coating. In addition, a magnesium cation is included (rather than a sodium cation), because the sodium cation is known to deposit coatings containing $Na_5Ti_3F_{14}$.

At block 104, a composition including a titanium compound is prepared. For example, ammonium hexafluorotitanate (($NH_4)_2TiF_6$) is dissolved in water.

At block 106, the composition of block 102 is mixed with the composition of block 104 to provide a titanium/magnesium solution. For example, the composition of block 104 is poured into the composition of block 102, and the resulting solution is stirred. In certain examples, the titanium/magnesium solution includes the titanium compound at a concentration of about 0.1 M to about 0.4 M, the boric acid at a concentration of about 0.3 M to about 1 M, the sodium tetraborate at a concentration of about greater than 0 M to about 0.0065 M, and the magnesium compound at a concentration of about 0.01 M to a 0.1 M. An exemplary titanium/magnesium solution is an aqueous solution including 0.2 M ($NH_4)_2TiF_6$, 0.6 M $H_3BO_3$, 0.0065 M $Na_2B_4O_7 \cdot 10H_2O$, and 0.02 M $MgSO_4$.

Variations in the concentrations of the different components may be used. Variable concentrations may affect aspects of the titanium/magnesium coatings including: (1) physical characteristics of the coating such as thickness and morphology (e.g., smooth, rough, continuous, patchy), (2) chemical properties of the coating such as rate of deposition, elemental composition, and phases, and (3) performance of the coating such as corrosion resistance (both the initial corrosion and the durability of the corrosion resistance over time in a corrosive environment), adhesion to the substrate (which can influence the corrosion resistance), and the adhesion of paints, primers, or overcoats.

Figure 2:
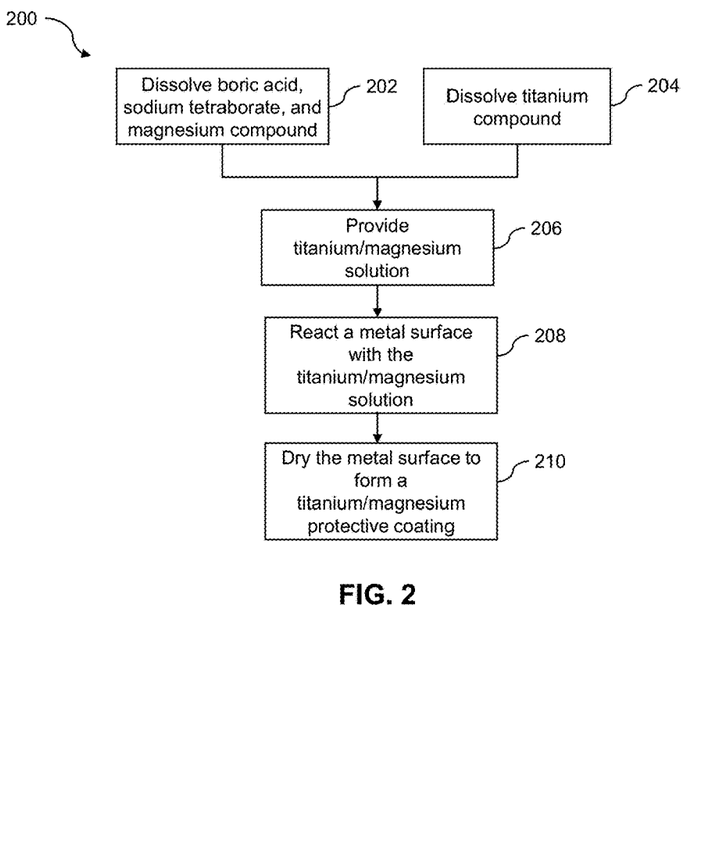
FIG. 2 illustrates an example process for applying a titanium/magnesium protective coating on a metal surface in accordance with an example of the present disclosure.

FIG. 2 illustrates an example process 200 for coating a metal surface with the titanium/magnesium solution. Blocks 202-206 are substantially similar to blocks 102-106 described above with respect to FIG. 1.

At block 208, the titanium/magnesium solution is reacted with a metal surface. In various examples, the metal surface is an aluminum surface. In some examples, the metal surface is an aluminum alloy surface. In one example, reacting the metal surface with the titanium/magnesium solution includes immersing the metal surface in the titanium/magnesium solution. For example, the metal surface may be immersed in the titanium/magnesium solution at room temperature for about 0.5 hours to about 20 hours (e.g., 16 or 17 hours). Shorter times at room temperature may also be used.

In addition, higher temperatures (e.g., 60° C.) may be used with shorter times (e.g., 4 hours). The coating time and temperature generally affect the thickness of the coating and the rate of deposition, respectively. The thickness of the coating is generally between about 500 nm and about 10 μm, such as between about 500 nm and about 2 μm, between about 250 nm and 5 μm, or between about 100 nm and about 10 μm. Time and temperature may also affect other properties of the coating.

In other examples, reacting the metal surface with the titanium/magnesium solution includes spray applying the titanium/magnesium solution on the metal surface.

In some examples, the metal surface is prepared or pre-treated before it is reacted with the titanium/magnesium solution. For example, the metal surface may be wiped with isopropyl alcohol, or treated with Ardrox® products or a tankline process solution. In another example, the metal surface is smoothed/polished or roughened before it is reacted with the titanium/magnesium solution.

Initially, it appears that the titanium/magnesium solution etches the metal surface thereby removing surface contamination, regardless of the initial surface preparation. Evidence for this etching comes from visual observations that (1) after wiping with isopropyl alcohol, the metal surface is hydrophobic, (2) the metal surface is still largely hydrophobic after immersing it in the coating solution for less than 1 minute and (3) by 2 to 3 minutes after immersing it in the coating solution, the metal surface becomes completely hydrophilic and the coating solution forms a continuous (e.g., break-free) layer over the metal surface.

This transition of the surface from hydrophobic to hydrophilic occurs without any apparent coating on the surface. Thus, it appears that within the first 3 minutes of contact with the coating solution, the surface is etched to form a hydrophilic surface. This etching occurs without significant deposition of any coating. Subsequently, a coating is deposited on the etched, hydrophilic metal surface.

At block 210, the metal surface is dried to form a titanium/magnesium protective coating. For example, the metal surface may be dried at room temperature. In various examples, the titanium/magnesium protective coating appears with an iridescent color of red to green. This likely indicates that the coating is optically transparent. In several examples, the titanium/magnesium protective coating includes a mixture of two or more compounds and further includes titanium dioxide ($TiO_2$).

In some examples, organic coatings such as primer and paint are applied to the dried titanium/magnesium protective coating. For example, primer may be applied to the dried titanium/magnesium protective coating, and the paint is applied on the primer.

The chemical phase of the titanium/magnesium coating and the precipitate that forms concurrently with the titanium/magnesium coating was measured using X-ray diffraction (XRD), with Cu K-alpha radiation (wavelength=1.5406 Å).

Figure 3:
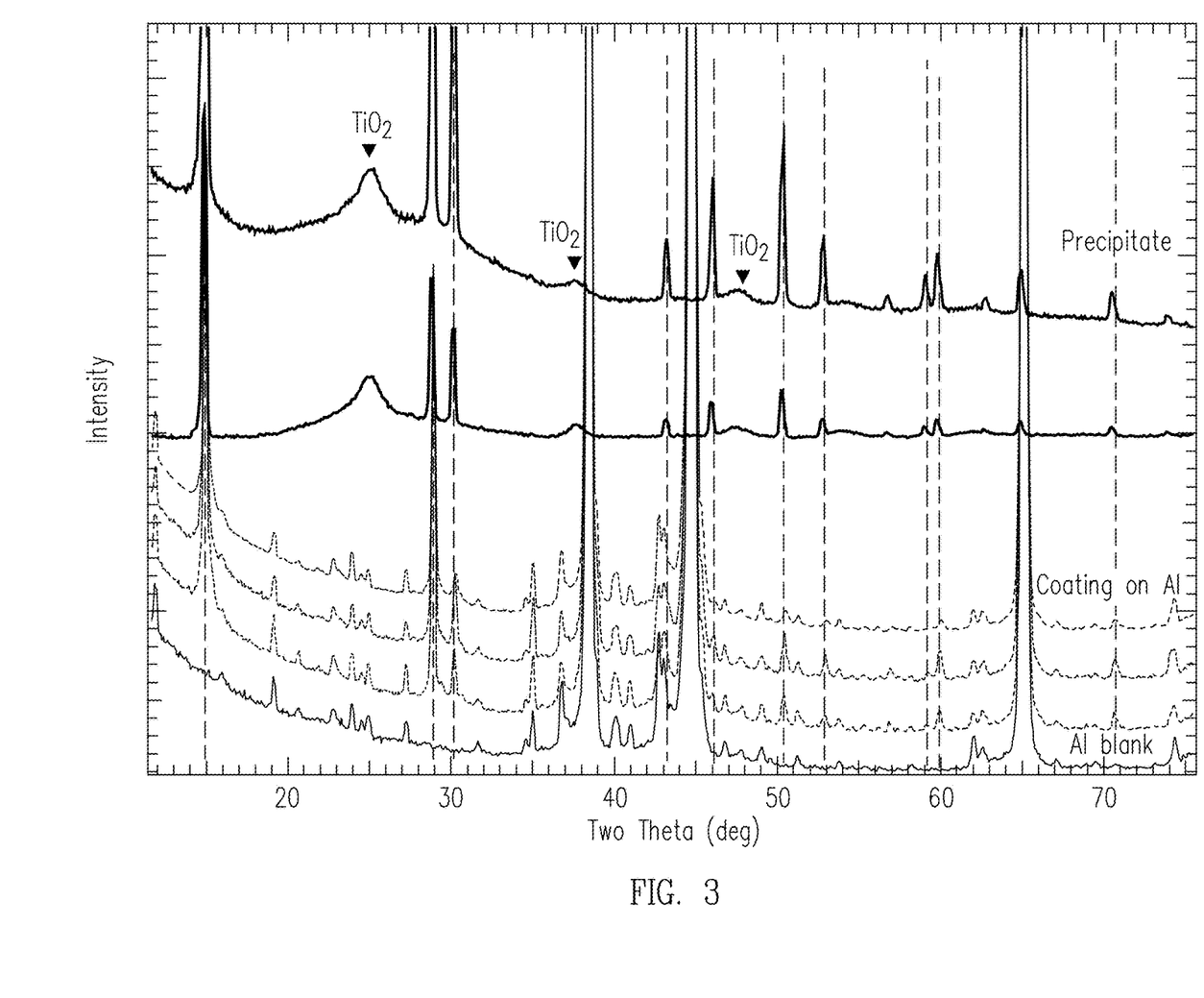
FIG. 3 are X-ray diffraction patterns of an aluminum substrate, aluminum substrates coated with a titanium/magnesium coating, and precipitates that form concurrently with the titanium/magnesium coating in accordance with an example of the present disclosure.

FIG. 3 provides the XRD spectra of an uncoated aluminum alloy 2024 panel, coated aluminum alloy 2024 panels, and precipitates that formed concurrently with the titanium/magnesium coating. The bottommost XRD pattern is from an uncoated aluminum alloy 2024 panel. The largest peaks are attributed to the aluminum. The numerous smaller peaks are minor peaks of aluminum, as well as primary peaks from the secondary phases present in the aluminum alloy. The next three XRD patterns are obtained from coated aluminum alloy 2024 panels. The peaks indicated by the vertical dashed lines are peaks from the crystalline phase of the titanium/magnesium coating.

The top two XRD patterns are from precipitates that form concurrently with the titanium/magnesium coating. These spectra contain no aluminum peaks because they are from precipitates that formed in the bulk of the coating solution without involving the aluminum panel. As can be seen, these precipitates contain the same crystalline phase seen in the titanium/magnesium coatings. In addition, the precipitates contain an amorphous (or very poorly crystalline) $TiO_2$ phase. No $TiO_2$ is evident in the XRD pattern of the coatings. However, broad peaks from poorly crystalline $TiO_2$ could be hidden by the diffraction peaks from the aluminum alloy substrate.

Figure 4:
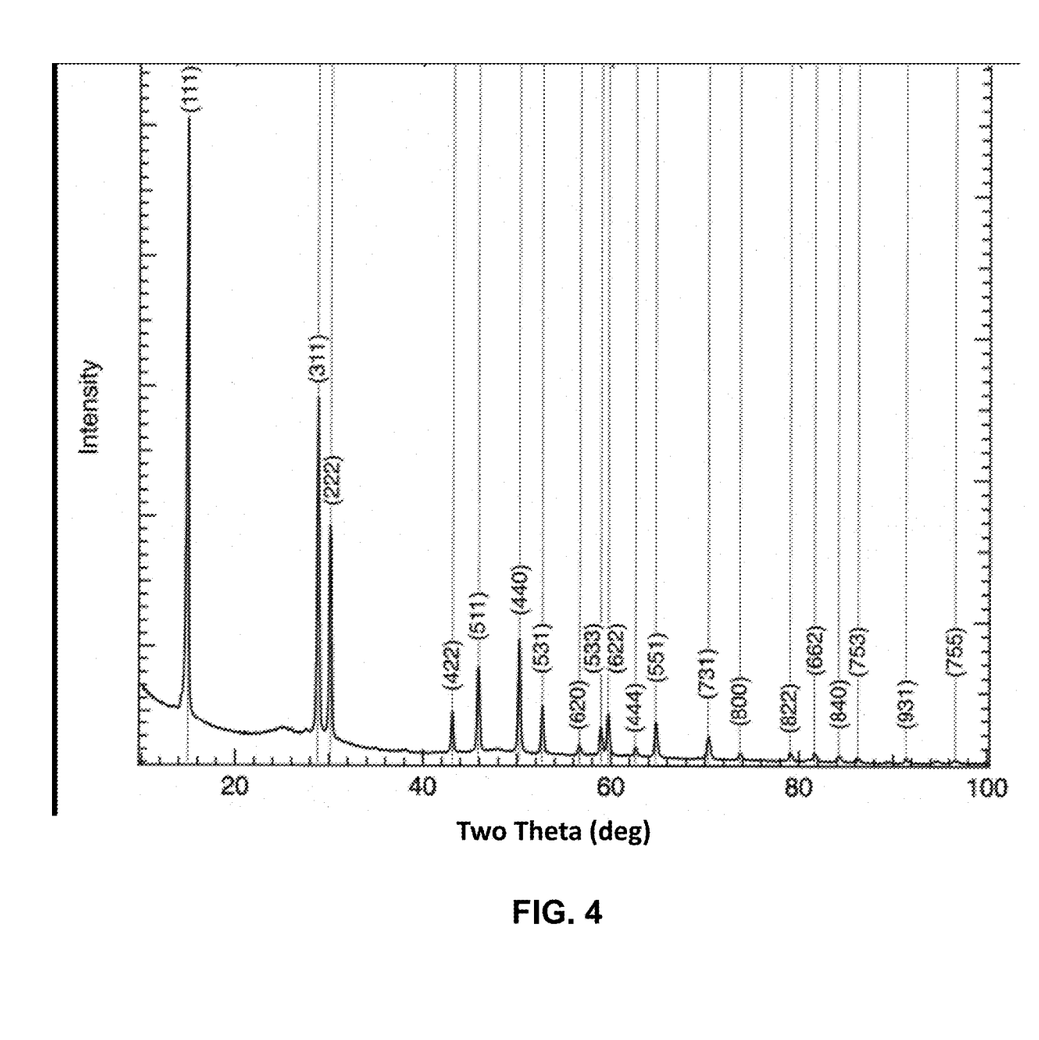
FIG. 4 is an X-ray diffraction pattern of a precipitate that forms concurrently with the titanium/magnesium coating in accordance with an example of the present disclosure.

FIG. 4 is another XRD pattern of the precipitate that forms concurrently with the titanium/magnesium coating and some $TiO_2$. Nineteen (19) diffractions peaks corresponding to the crystalline phase were identified.

Table 1 below provides 20 peak positions (with an uncertainty of ±0.25°) and corresponding lattice spacing for the precipitate.

TABLE 1

| | XRD DATA | |
|---|---|---|
| No. | Two Theta (Deg) | Interplanar Spacing d (Å) |
| 1 | 14.89 | 5.94 |
| 2 | 28.78 | 3.10 |
| 3 | 30.09 | 2.97 |
| 4 | 43.10 | 2.10 |
| 5 | 45.85 | 1.98 |
| 6 | 50.20 | 1.82 |
| 7 | 52.66 | 1.74 |
| 8 | 56.63 | 1.62 |
| 9 | 58.90 | 1.57 |
| 10 | 59.65 | 1.55 |
| 11 | 62.59 | 1.48 |
| 12 | 64.75 | 1.44 |
| 13 | 70.31 | 1.34 |
| 14 | 73.71 | 1.28 |
| 15 | 79.02 | 1.21 |
| 16 | 81.63 | 1.18 |
| 17 | 84.20 | 1.15 |
| 18 | 86.23 | 1.13 |
| 19 | 91.34 | 1.08 |
| 20 | 96.59 | 1.03 |

The XRD peaks were compared to patterns of over 400,000 compounds in several XRD databases without finding a match. Based on this, the XRD pattern appears to characterize a novel crystalline titanium and magnesium compound.

Although the exact composition and atomic positions are unknown, the XRD pattern may correspond to a structure with a cubic symmetry with a lattice parameter of about a=10.275 Å±0.05 Å. Identical patterns were obtained using $Mg(CH_3COO)_2$, $MgSO_4$, $MgCl_2$, or $Mg(NO_3)_2$, indicating that the various anions are not present in the crystal structure. Similarly, the same pattern was obtained when using dipotassium titanium hexafluoride ($K_2TiF_6$) or $(NH_4)_2TiF_6$, indicating that the cations are not present in the crystal structure.

Thermal stabilities show that the crystalline phase decomposes with gentle heating at 150° C. (substantially decomposed) and 250° C. (completely decomposed). Thermal stabilities may be measured by any technique known in the art, such as differential scanning calorimetry (DSC), thermogravimetric analysis (TGA), or accelerating rate calorimetry (ARC). Thermal stabilities may also be measured using a temperature treatment (ramp or soak) and XRD (in situ or ex situ) to identify a phase change. Concurrent disappearance of all the peaks with heating indicates that the XRD pattern very likely belongs to a single phase. The low decomposition temperature of 250° C. indicates that the phase likely contains hydroxide anions, molecularly bound water, or possibly molecularly bound HF.

Figure 5A:
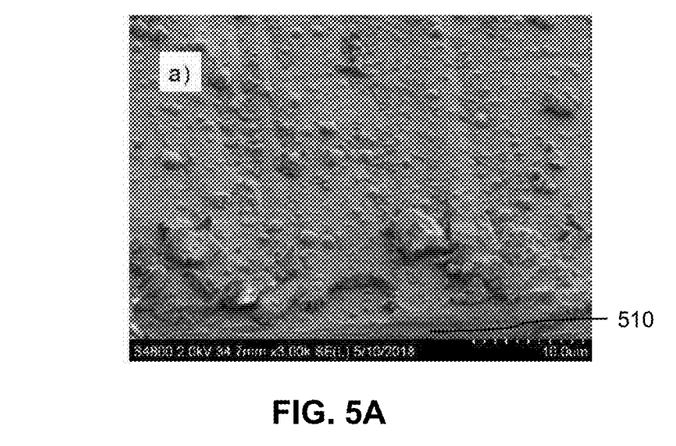
FIGS. 5A-5D are scanning electron micrographs of deposited titanium/magnesium coatings in accordance with an example of the present disclosure.
Figure 5B:
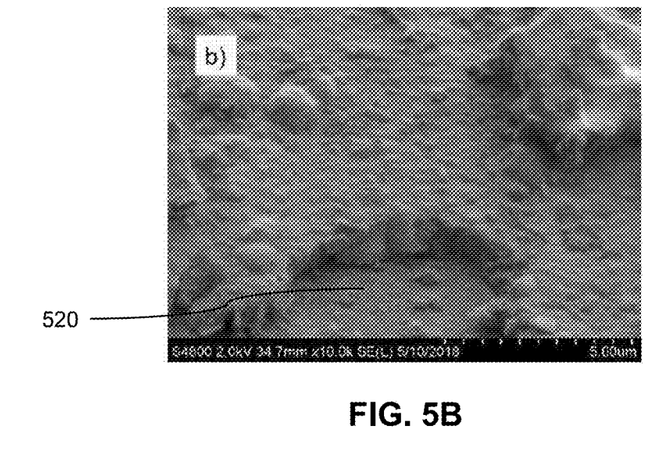
Figure 5C:
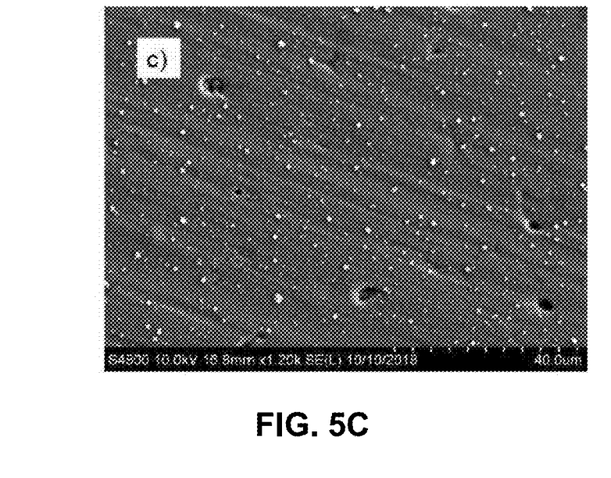
Figure 5D:
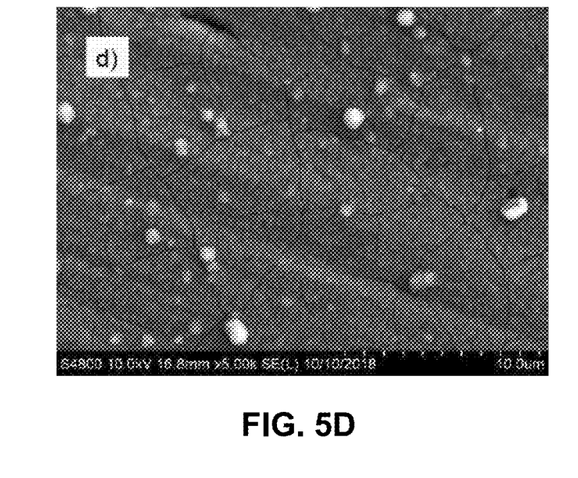

FIGS. 5A-5D are scanning electron micrographs of example titanium/magnesium coatings. FIG. 5A shows a region near a scratch 510 that was intentionally made to fracture the coating. The edge of the scratch 510 is just visible from the bottom of the micrograph. Debris from the scratch is seen on the coating. FIG. 5B shows a close up of a fractured and spalled-off region 520, showing the coating in cross section. The coating is continuous and dense with no clear crystal faceting. This indicates that the crystalline size is likely small, e.g., less than or equal to 1 µm. The coating also appears well adhered to the substrate because remnants of the coating remain in the fractured and spalled-off region 520, which indicates cohesive failure within the coating as opposed to adhesive failure at the coating/substrate interface. FIGS. 5C and 5D show plan views of the coatings. Small defects and fine cracks are visible.

EXAMPLE 1

Two coated panels were made using the following procedure. First, 18.594 g of $H_3BO_3$, 1.249 g $Na_2B_4O_7 \cdot 10H_2O$, and 1.206 g of $MgSO_4$ were dissolved in 399.95 g of deionized (DI) water in a 1000 mL beaker with magnetic stirring. Next, 19.811 g of $(NH_4)_2TiF_6$ was dissolved in 100.027 g DI water in a 250 mL beaker with magnetic stirring. The titanium solution was poured into the boric acid solution and stirred for 15 seconds. Approximately half of the combined coating solution was poured into each of two 5"×7" trays.

Two aluminum alloy 2024 panels were attached using double-back tape to two fixtures designed for holding 4"×6" panels facedown approximately 0.5 inch above the bottom of the trays. The faces to be coated on the aluminum panels were wiped with isopropyl alcohol.

The fixtures were placed into the trays containing the coating solution. The fixtures were sloshed back and forth for about 2 to 3 minutes, and checked by lifting out to ensure that the aluminum surface to be coated was completely wet by the coating solution (e.g., water-break-free surface) and was free of any trapped air bubbles. The trays were covered to reduce evaporation and left at room temperature overnight.

After 17 hours, the fixtures with the aluminum panels were lifted out of the trays. The coated surfaces were rinsed under running DI water for about 5 minutes and wiped gently with wet Kimwipes™. The panels were pried off of the double-back tape. The backside of the panels were rinsed with DI water and scrubbed with a maroon Scotch-Brite™ pad. The panels were blown free of water with compressed nitrogen and allowed to dry in air.

EXAMPLE 2

Figure 6:
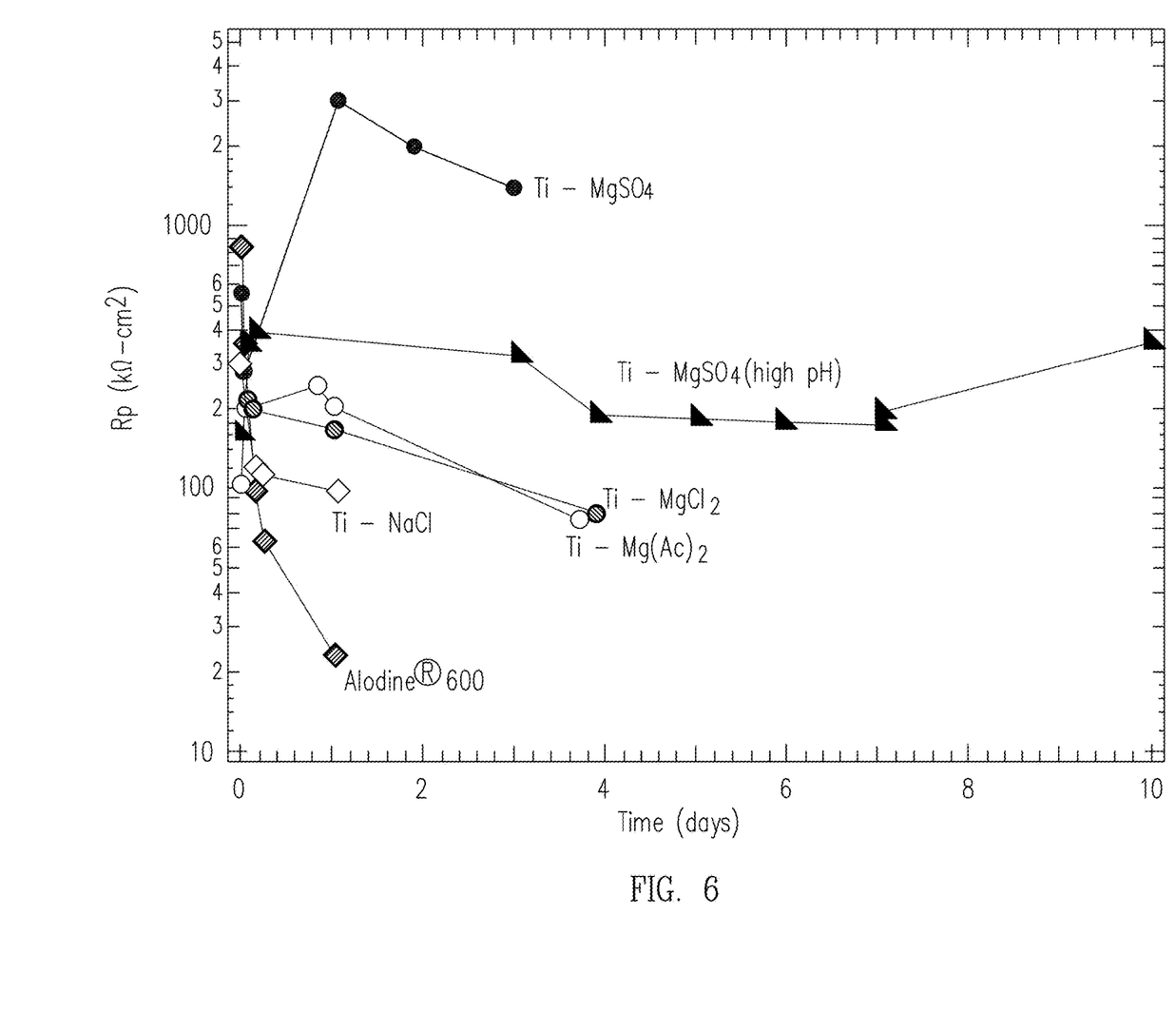
FIG. 6 illustrates the durability of the titanium/magnesium coatings in a 0.1 M NaCl solution.

Following coating, 2024-T3 aluminum alloy samples were tested for corrosion protection in a bulk electrolyte consisting of 0.1 M sodium chloride (NaCl) solution buffered with borate at pH 6.4. Standard electrochemical impedance spectroscopy (EIS) techniques were used to determine the polarization resistance. The polarization resistance is a measure of the corrosion protection, with higher polarization resistance corresponding to improved corrosion protection. The polarization resistances of several coatings as a function of time in the corrosive 0.1 M NaCl solution are shown in FIG. 6.

For reference, a coating made with a commercial chromate-based conversion coating product (Alodine® 600) is shown. The initial resistance is about 600 kOhm-$cm^2$, and then decreases to about 25 kOhms-$cm^2$ in about 1 day.

A coating made with NaCl added to the solution instead of $MgCl_2$ is also shown. This coating has an initial resistance of about 300 kOhm-$cm^2$, which decreases to about 100 kOhms-$cm^2$ and remains at 100 kOhms-$cm^2$ up to at least 1 day.

A coating in accordance with an example of the present disclosure was made using $MgCl_2$. The coating solution contained 1.489 g $H_3BO_3$, 0.036 g of $MgCl_2$, and 1.584 g of $(NH_4)_2TiF_6$ dissolved in 39.977 g of deionized water. The $(NH_4)_2TiF_6$ was added last and stirred for 2 min. Two 1"×1" 2024 aluminum coupons were coated by immersing the coupons face down in the coating solution for 16 hours. The initial resistance was about 200 kOhms-$cm^2$. This resistance decreased to 80 kOhms-$cm^2$ in 4 days. The maintained high resistance illustrates the better durability for corrosion protection for coatings with the novel crystalline titanium/magnesium phase.

A coating in accordance with an example of the present disclosure was made using $Mg(CH_3COO)_2$. The coating solution contained 9.318 g $H_3BO_3$, 0.539 g of $Mg(CH_3COO)_2$, and 9.940 g of $(NH_4)_2TiF_6$ dissolved in 250.12 g of deionized water. The $(NH_4)_2TiF_6$ was added last and stirred for 2 minutes. One 1"×1" 2024 aluminum coupon was coated by immersing the coupon face down in about 20 mL of the coating solution for 16 hours. The initial resistance was about 100 kOhms-$cm^2$. This resistance increased to greater than 200 kOhms-$cm^2$ before decreasing to about 100 kOhms-$cm^2$ in 4 days.

A coating in accordance with an example of the present disclosure was made using $MgSO_4$. The coating solution contained 9.298 g $H_3BO_3$, 0.601 g of $MgSO_4$, and 9.298 g of $(NH_4)_2TiF_6$ dissolved in 250 g of deionized water. The $(NH_4)_2TiF_6$ was added last and stirred for 4 minutes. One 1"×1" 2024 aluminum coupon was coated by immersing the coupon face down in about 20 mL of the coating solution for 16 hours. The initial resistance was 300 kOhms-$cm^2$. This resistance increased to 3,000 kOhms-$cm^2$ (3 MOhms-$cm^2$) before beginning to decrease.

A coating in accordance with an example of the present disclosure was made using 0.02 M $MgSO_4$ and 0.0065 M $Na_2B_4O_7 \cdot 10H_2O$ at high pH. The coating solution contained 2.979 g $H_3BO_3$, 0.203 g of $Na_2B_4O_7 \cdot 10 H_2O$, 0.198 g of $MgSO_4$, and 3.154 g of $(NH_4)_2TiF_6$ dissolved in 80.012 g of deionized water. The $(NH_4)_2TiF_6$ was added last and stirred for 2.5 minutes. Four 1"×1" 2024 aluminum coupons were coated by immersing the coupons face down each in about 20 mL of the coating solution for 16 hours. This coating solution was designated "high pH" because of the added $Na_2B_4O_7 \cdot 10H_2O$, which raised the pH slightly from about pH=3-4 to about pH=4. The initial resistance was 160 kOhms-$cm^2$. This resistance increased to 400 kOhms-$cm^2$ and was maintained between 200 kOhms-$cm^2$ and 400 kOhms-$cm^2$ for at least 10 days.

EXAMPLE 3

In order to be able to reuse the coating solution multiple times, a coating solution was prepared containing 0.375 g $H_3BO_3$, 0.096 g of $MgSO_4$, and 1.579 g of $(NH_4)_2TiF_6$ dissolved in 40.003 g of deionized water. The $(NH_4)_2TiF_6$ was added last and stirred for 4 minutes. Two 1"×1" 2024 aluminum coupons were coated by immersing the coupon face down each in about 20 mL of the coating solution for 16 hours. After this initial run of using the coating solution, the same coating solution was used repeatedly for an additional 5 runs (6 in total) over 10 calendar days. Coatings were obtained from each run, with the sixth run coating having a resistance of 120 kOhms-$cm^2$.

When introducing elements of the present invention or exemplary aspects or example(s) thereof, the articles "a," "an," "the," and "said" are intended to mean that there are one or more of the elements. The terms "comprising," "including," and "having" are intended to be inclusive and mean that there can be additional elements other than the listed elements. Although this invention has been described with respect to specific examples, the details of these examples are not to be construed as limitations. Different aspects, examples and features are defined in detail herein. Each aspect, example or feature so defined can be combined with any other aspect(s), example(s) or feature(s) (preferred, advantageous or otherwise) unless clearly indicated to the contrary. Examples described above illustrate but do not limit the invention. It should also be understood that numerous modifications and variations are possible in accordance with the principles of the present disclosure. Accordingly, the scope of the invention is defined only by the following claims.

What is claimed is:

1. A crystalline titanium and magnesium compound, having an X-ray diffraction (XRD) pattern having interplanar spacing (d-spacing) values at 5.94, 3.10, 2.97, 2.10, 1.98, 1.82, and 1.74 angstroms.

2. The crystalline titanium and magnesium compound of claim 1, wherein the XRD pattern has additional interplanar spacing (d-spacing) values at 1.62, 1.57, 1.55, 1.48, 1.44, 1.34, 1.28, 1.21, 1.18, 1.15, 1.13, 1.08, 1.03 angstroms.

3. The crystalline titanium and magnesium compound of claim 1, further having a cubic symmetry and a lattice parameter from about 10.225 angstroms to about 10.325 angstroms.

4. The crystalline titanium and magnesium compound of claim 1, further having an XRD pattern, produced with an x-ray wavelength of 1.54 angstroms (Cu k alpha), having peaks at 14.89°, 28.78°, 30.09°, 43.10°, 45.85°, 50.20°, and 52.66°±0.25 2θ.

5. The crystalline titanium and magnesium compound of claim 4, further having XRD peaks, produced with an x-ray wavelength of 1.54 angstroms (Cu k alpha), at 56.63°, 58.90°, 59.65°, 62.59°, 64.75°, 70.31°, 73.71°, 79.02°, 81.63°, 84.20°, 86.23°, 91.34°, and 96.59°±0.25 2θ.

6. The crystalline titanium and magnesium compound of claim 1, wherein titanium is present at about 15 at % to about 25 at % and magnesium is present at about 1 at % to about 8 at %.

7. The crystalline titanium and magnesium compound of claim 6, further comprising oxygen and fluorine.

8. The crystalline titanium and magnesium compound of claim 7, wherein the oxygen is present at about 30 at % to about 45 at % and the fluorine is present at about 30 at % to about 40 at %.

9. The crystalline titanium and magnesium compound of claim 8, wherein titanium is present at about 25 at %, magnesium is present at about 5 at %, oxygen is present at about 35 at %, and fluorine is present at about 35 at %.

10. A protective coating comprising the crystalline titanium and magnesium compound of claim 1.

11. The protective coating of claim 10, further comprising titanium dioxide.

12. The protective coating of claim 10, having a thickness of about 500 nm to about 10 μm.

13. A method of preparing a crystalline titanium and magnesium compound, having an X-ray diffraction (XRD) pattern having interplanar spacing (d-spacing) values at 5.94, 3.10, 2.97, 2.10, 1.98, 1.82, and 1.74 angstroms, comprising:
preparing a solution comprising:
a titanium compound at a concentration of about 0.1 M to about 0.4 M,
boric acid at a concentration of about 0.3 M to about 1 M,
sodium tetraborate at a concentration of about greater than 0 M to about 0065 M, and
a magnesium compound at a concentration of about 0.01 M to about 0.1 M.

14. The method of claim 13, wherein the titanium compound comprises ammonium hexafluorotitanate and the magnesium compound comprises one or more of magnesium acetate, magnesium sulfate, magnesium chloride, or magnesium nitrate.

15. The method of claim 14, wherein preparing the solution comprises:
dissolving the boric acid, the sodium tetraborate, and the magnesium compound in water to form a first solution;
dissolving the titanium compound in water to form a second solution; and
pouring the second solution into the first solution.

16. A method, comprising:
preparing a solution comprising a titanium compound at a concentration of about 0.1 M to about 0.4 M, boric acid at a concentration of about 0.3 M to about 1 M, sodium tetraborate at a concentration of about greater than 0 M to about 0.0065 M, and a magnesium compound at a concentration of about 0.01 M to a 0.1 M to form a titanium/magnesium solution.

17. The method of claim 16, further comprising:
reacting a metal surface with the titanium/magnesium solution; and
drying the metal surface with the titanium/magnesium solution to form a titanium/magnesium protective coating on the metal surface.

18. The method of claim 17, wherein reacting the metal surface with the titanium/magnesium solution comprises immersing the metal surface in the titanium/magnesium solution.

19. The method of claim 17, further comprising applying a primer and/or a paint on the titanium/magnesium protective coating.

20. The method of claim 17, wherein the metal surface comprises aluminum or an aluminum alloy substrate selected from 2024-T3 aluminum alloy, 6061 aluminum alloy, or 7075 aluminum alloy.

* * * * *

UNITED STATES PATENT AND TRADEMARK OFFICE
CERTIFICATE OF CORRECTION

PATENT NO. : 11,584,859 B2
APPLICATION NO. : 16/541754
DATED : February 21, 2023
INVENTOR(S) : John J. Vajo, Jason Graetz and Alain A. Adjorlolo

Page 1 of 1

It is certified that error appears in the above-identified patent and that said Letters Patent is hereby corrected as shown below:

In the Claims

In Claim 13, Column 10, Line 14, please change "0065" to --0.0065--

Signed and Sealed this
Fourth Day of April, 2023

Katherine Kelly Vidal
*Director of the United States Patent and Trademark Office*